United States Patent [19]

Ischebeck

[11] 4,392,767
[45] Jul. 12, 1983

[54] STORAGE APPARATUS INCLUDING CONVEYOR MEANS

[76] Inventor: Klaus Ischebeck, Elisabethstrasse 20, 4503 Dissen, Fed. Rep. of Germany

[21] Appl. No.: 236,399

[22] Filed: Feb. 20, 1981

[30] Foreign Application Priority Data

Mar. 21, 1980 [DE] Fed. Rep. of Germany ....... 3010884

[51] Int. Cl.³ .............................................. B65G 1/06
[52] U.S. Cl. ..................................... 414/136; 198/778
[58] Field of Search ............... 414/135, 136, 273, 285; 198/603, 606, 778

[56] References Cited

U.S. PATENT DOCUMENTS 3,803,556 4/1974 Duffy ............................... 414/136 X
4,078,648 3/1978 Hinchcliffe et al. ............. 198/603 X
4,201,288 5/1980 Capelleveen ........................ 198/778

Primary Examiner—Robert G. Sheridan
Attorney, Agent, or Firm—Jordan and Hamburg

[57] ABSTRACT

Storage apparatus for articles capable of being retrieved includes at least one conveyor disposed generally in at least one plane and arranged in a generally sinuous manner formed by a plurality of joined loops each having generally U-shaped portions and generally straight portions with the straight portions being disposed side-by-side in generally parallel array. A receiving station receives articles and transfers them to the conveyor, and a take-off device takes off articles from the conveyor, the take-off device being arranged within at least one of the U-shaped portions for taking off the articles from the conveyor as the article is disposed in at least one U-shaped portion of the conveyor.

14 Claims, 3 Drawing Figures

STORAGE APPARATUS INCLUDING CONVEYOR MEANS

BACKGROUND OF THE INVENTION

This invention relates to a storage apparatus for identifiable single articles, capable of being chosen singly at random, particularly storage containers, and comprising at least one conveyor, a receiving station, and a delivery station.

Storage apparatus of the aforedescribed type are known in the field in varying constructions, and such known apparatus are furnished with various conveyor devices in which case large storage needs require a very large space. Furthermore, storage apparatus capable of accepting large amounts of goods and having great density of storage have the disadvantage of requiring a large access or retrieval time.

Accordingly, an object of the present invention is to provide a storage apparatus, for instance an intermediate storage for industrial production flow, having a high capacity and a high storage density concurrent with relatively short access or retrieval times, and facilitating a simple surveyable feed and issue processes as well as storage processes adapted to be controlled by a computer.

This objective is achieved according to the present invention by providing a storage apparatus having an endless circulating conveyor which, in at least on one plane, is formed in loops, lying parallel in generally side-by-side relationships, and which include a plurality of take-out devices, such take-out devices being located at the frontal or inner arcs of the loops and being operatively associated with the delivery stations.

Thus the area of storage is determined by an endlessly circulating conveyor, which may be formed in any desired conventional form, for instance as a belt conveyor, a chain conveyor or a roll conveyor and which assures that the complete contents of the storage apparatus is continually moved while delivering the goods. This movement provides, together with one-way characteristics of the conveyor, an exceedingly simple and easily surveyable condition for receiving goods or articles because one single receiving station may be utilized to feed the entire storage apparatus.

Although such a conveyor consisting of loops disposed in side-by-side relationships in a sinuous manner covers most of the area and needs minimal space for its construction proper, the resulting density of storage does not cause large access or retrieval time despite the resulting storage density even at large filling rates of the apparatus. The individual articles are located at storage sites along the conveyor, and the conveyor brings all the storage sites after a limited time to the frontal side of the loops, the time being a function of the sequence of the storage sites.

Each loop is preferably furnished with a take-out device at its front, although of course, when no immediate delivery is desired, only part of the loops may be furnished with take-out devices.

Basically the storage apparatus may be built in its simplest embodiment upon one plane only. However, for higher storage capacities, a conveyor may be provided which runs through a plurality of planes lying one above the other. In such a case the loops may be built congruently in all planes and run in identical directions. This leads to a very simple support construction and drive mechanism, but will result in relatively long oblique connections between the planes. The planes may also alternatingly be run through in opposite directions resulting in extremely short connections between the planes because the conveyor faces at the ending edge of each plane, the beginning of the next plane simply by moving upwardly or downwardly.

A particular advantage of the apparatus lies in the possibility to regulate and coordinate the access according to the take-out devices. Thus the serial order resulting automatically in an endless conveyor makes it possible to identify individual goods according to their position and to expel them when needed. Marked single goods, containers, for example, may basically be taken out once they are identified and their position upon the conveyor is identified, as soon as they have reached the respective position of a take-out device upon the frontal side of the loop. A computer, for instance, is capable of determining the desired take-out time, when the starting position of a part is given and when the running time and running path are evaluated. The computer can also find a stored item wherever it might be upon the apparatus.

Preferably though the apparatus is furnished with readers, allocated to the take-out devices for coding of loaded parts, so that an individual part or a part of a defined kind may be retrieved by using its code and may be ejected by the take-out device whenever such an individual part reaches the take-out device.

Preferably a process control computer may be used for storage of withdrawal demands, for the reading of code numbers, for the choice of a take-out device in the case where a plurality of identical goods can reach a take-out position, and for regulating time or sequence demanded by delivery processes. The process computer may also possess additional control and regulating functions, for instance, control of input and running control of inventory.

Other features which are considered characteristic of the invention are set forth in the appended claims.

Although the invention is illustrated and described in relationship to specific embodiments, it is nevertheless not intended to be limited to the details shown, since various modifications and structural changes may be made therein without departing from the spirit of the invention and within the scope and range of equivalents of the claims.

The construction and operation of the invention, however, together with additional objects and advantages thereof will be best understood from the following description of specific embodiments when read in connection with the accompanying drawings.

DESCRIPTION OF THE PREFERRED EMBODIMENTS

Figure 1:
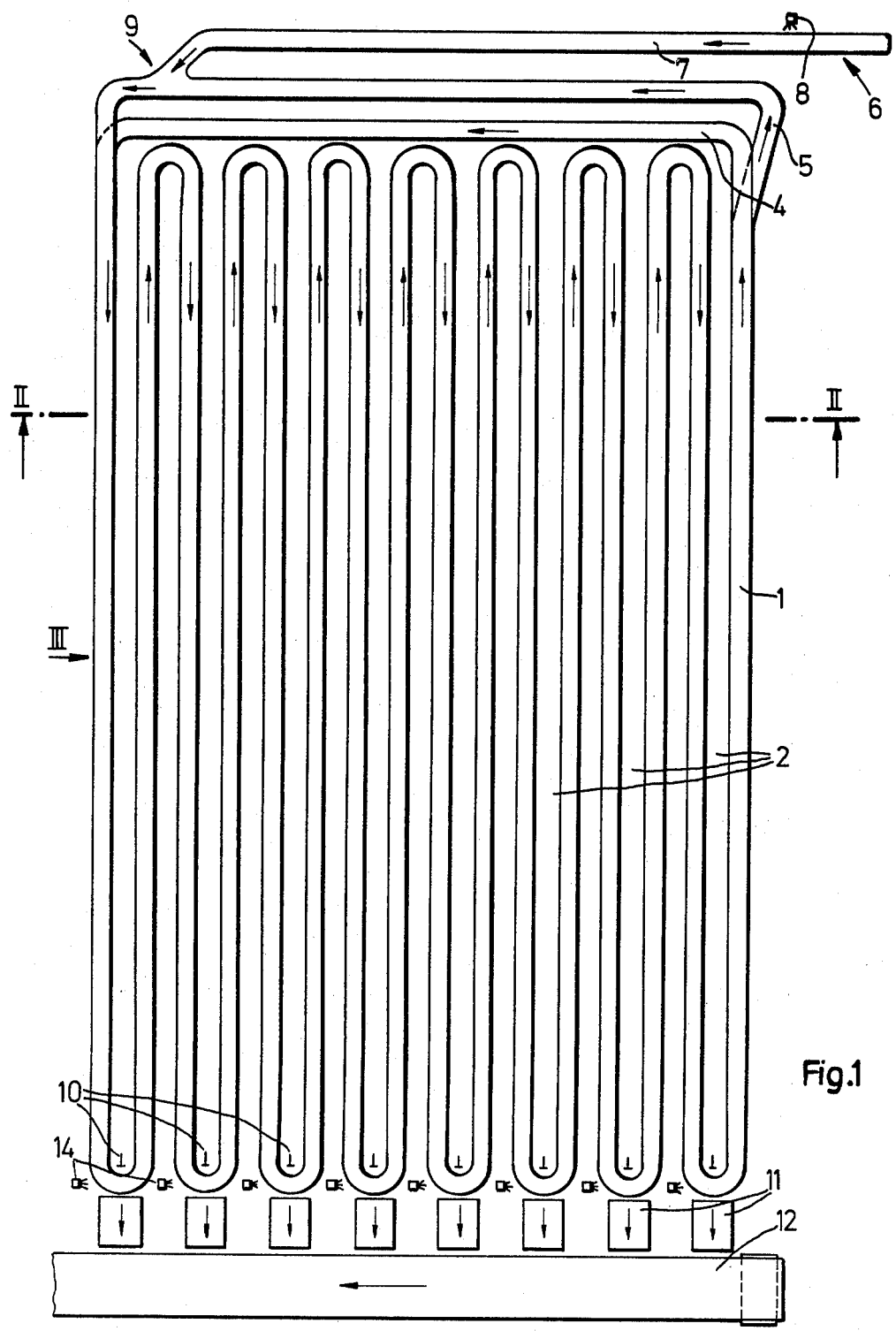
FIG. 1 is a top view of a storage device according to one embodiment of the present invention.

The storage apparatus in the drawings consists of an endlessly circulating conveyor 1. The details of construction of the conveyor 1 are not shown but mainly the principal parts are shown. The conveyor 1 may be formed in any known manner, for instance as a belt or chain conveyor or a roller conveyor, and may not necessarily consist of identical parts, but may consist of different elements in various sections, for example some driven and some idling. The conveyor 1 is capable of accepting a large number of single items or articles, particularly packaged articles, such as boxes and containers, at a high density of storage, and is capable of retaining them in a steadily moving transport. For this purpose the conveyor 1 is arranged, as shown in FIG. 1, in loops running back and forth, for example, in a sinuous fashion such as heating coils or heating wires might be arranged.

Due to the fact that the floor space at disposal is occupied mostly by parallel track sections which may be laid at minimal distances from each other, a most advantageous use of floor space results with such an arrangement. This loop design may easily be closed to form an endless line-loop by an external return track connecting the first and the last loop. In this manner the design shown in the top view of FIG. 1 could also be used for a storage device occupying one plane only.

Figure 2:
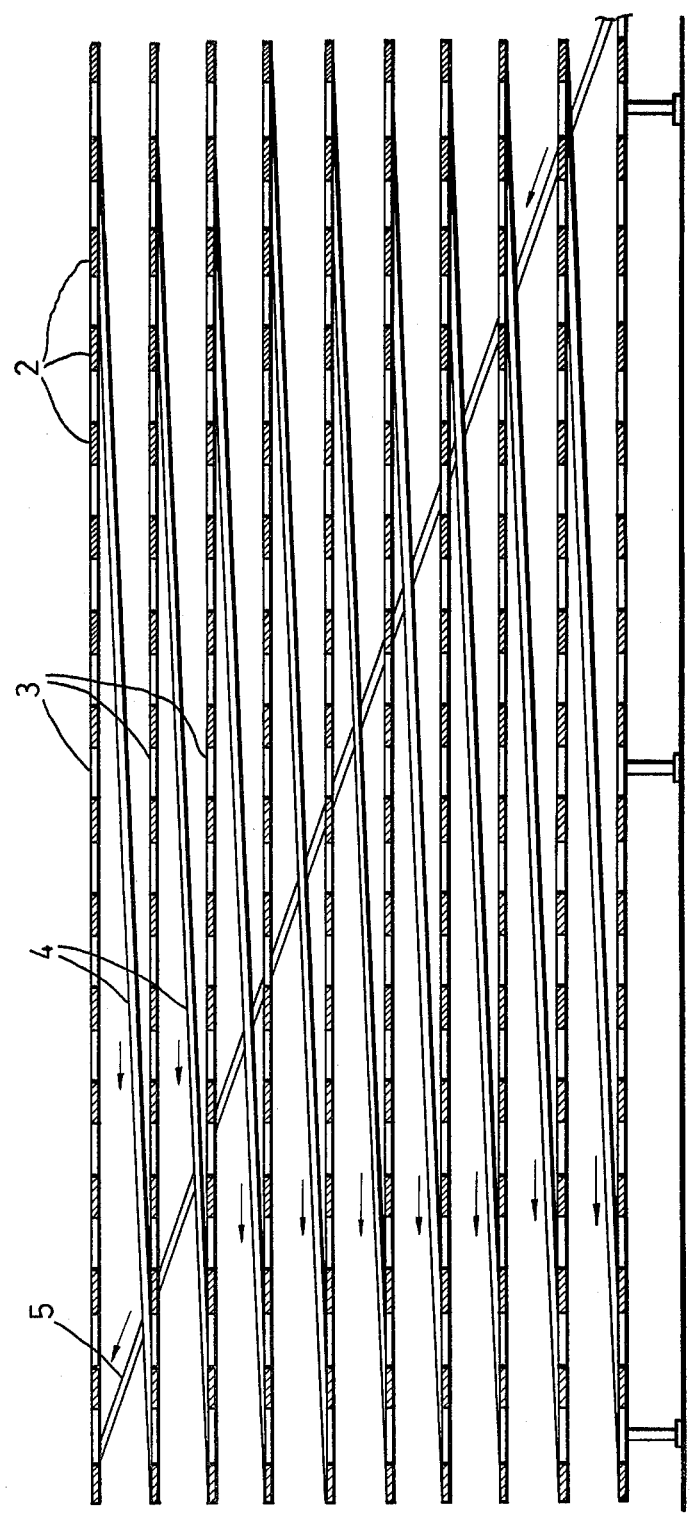
FIG. 2 is a sectional view taken along the line II—II in FIG. 1.
Figure 3:
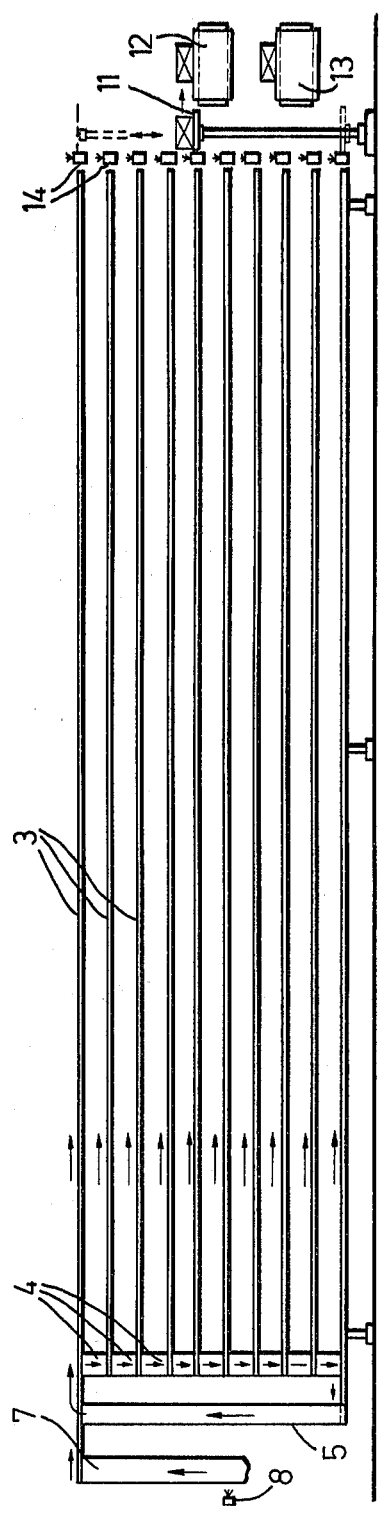
FIG. 3 is a view looking in the direction of the arrow III in FIG. 1.

A good use of space is preferably obtained with a higher storage density when the storage apparatus extends over a plurality of planes 3 in which case the conveyor runs through one plane after the other. The schematic of connections is readily perceived in FIG. 2.

Thus the planes 3 are crossed consecutively from the top downwardly by the conveyor in which case the conveyor arriving at the end of one plane moves along oblique sections 4 to the next lower plane. These oblique sections 4 lie congruently under each other. After crossing the bottom most plane, the conveyor returns to the beginning of the top most plane along a correspondingly steeper oblique section 5. This results in an exceedingly simple method of conveying because the parallel loops are designed congruently in planes lying one above the other and because they all run in the same direction. Such a design permits a simple, strong, space saving and easily overseen construction of conveyors.

Nevertheless, the construction of a storage device according to the invention is not fixed upon such routes of the conveyors. When the conveyor loops of the planes lying one above the other are arranged such as in FIG. 1 but run oppositely from plane to plane, a very short connection between the planes arises because the beginning track and ending track of a neighboring underlying plane lie above each other.

In case a relatively steep ascension of the conveyor 5 has to be avoided or prevented, an interleaving sequence of the planes may be provided where a conveyor, for instance, runs along every second plane in descension and runs at the interleaving planes on its ascension.

The basic concept of a storage device constantly recirculated by an endlessly circulating conveyor provides for very simple receiving of goods because it suffices at first to reach any point of conveyor 1 in order to feed it completely. There is no need for a multi-branched or movable feeder system in order to reach individual storage places. The storage places pass the receiving station and are thus accessible. In order to increase the effectiveness of receiving goods, a plurality of feeding stations may be provided which are disposed at distances corresponding to the length of the conveyor, but, on the other hand, retain the possibility to subsist on a single input station for a relatively large storage flow.

In the illustrated embodiment a receiving station 6 consists of a receiving conveyor 7 and a receiving reader 8. The receiving conveyor 7 enters or operatively leads to the conveyor 5 and 9 and thereafter passes to the first loop of the uppermost plane in order to run the storage in a planar manner from the top down. Thus newly fed-in wares or articles will run at first through all loops of the uppermost plane (see FIG. 2) from left to right and then in the same direction through the planes disposed below one under the other. This sequence is not the only one, inasmuch as the endless conveyor allows feeding at any desired and accessible spot.

The input reader 8 may be any controlling device having varied functions, and in the illustrated embodiment it is a code reader, which reads codings, particularly strip coding of containers, checks its legibility and brings the coded input to a non-illustrated computer. An illegible (based on conventional test numbers) or obviously wrongly coded load may be stopped or ejected. Otherwise the goods enter the conveyor whereby the input is stored in the computer as an addition to the inventory, and when so desired, with its position and time of addition. Thus the computer is capable of constantly recording the inventory of the storage apparatus.

While stores of high capacity and storage density usually have the disadvantage of long delivery or retrieval times, the delivery or retrieval time of the storage apparatus according to the present invention is relatively short, in other words equal to the run of the conveyor along one loop (maximum), thus to the run along two tracks. The average delivery time amounts to approximately the running time of the conveyor along one track. Means are present to make the conveyor accessible at the end of each loop and to remove goods therefrom.

For that purpose a take-out device 10, shown symbolically in FIG. 1, is associated with each loop at its frontal arc. This take-out device 10 makes it possible to eject any individual goods which are desired to be delivered or retrieved, and which pass the take-out device 10 on the conveyor. A vertical conveyor 11 allocated commonly to the loops disposed one above the other is capable of accepting the ejected goods and to set it upon one of two selected retrieving conveyors 12, 13 which run one above the other.

The construction of the delivery of single articles may be varied according to known transportation techniques. Thus, for example, a delivery station may be provided which is allocated in common to the loops arranged one on top of the other and connected to the vertical conveyor 11 instead of stationary delivery stations allocated to the individual loops. The take-out devices 10 may also influence the arrangement of horizontal or oblique conveyors, and this technique allows numerous variations. In such cases a plurality of take-out devices may be provided which are equally distributed along the conveyor forming the storage. These take-out devices are capable of acting at each position of the storage apparatus within maximum or average time spans, respectively and thereby upon each individual article and thereby effect its delivery.

Control of delivery of a desired article due to a called order may, for instance, be actuated by a computer which identifies the selected article and its serial position on the conveyor and the position of the conveyor itself in order to signal on time the nearest take-out device to be reached by the selected article. There are, of course, factors to be considered and conditions for correct functioning particularly relating to the well defined position of the goods upon the conveyor, the synchronisation of the conveyor, and the synchronisation of the computer with the conveyor.

Therefore, it is preferable to allocate to each take-out device a delivery reader 14 which reads the codes of the passing articles. These codes are transmitted to a computer which regulates and controls the take-out devices. In the simplest case, the computer will store the code of a called-for stored article and then effect operation of the take-out device closest to the reader once the reader transmits the respective code.

The computer can furthermore provide a central regulating function in such a manner that it choses one individual take-out device when several of the ancillary readers announce a coding of the demanded kind. Thus, the computer is capable of choosing when more than one article is ready to be taken out.

Such a computer is also capable to control the delivery of an article in a correct sequence when a plurality of articles are on their way to be delivered. It may be planned additionally that since the vertical conveyor 11 has one single acceptance device, there may be furnished between the vertical conveyor 11 and the conveyor or storage device, respectively, a storage device or at least an intermediate place of deposit. Difficulties caused by simultaneous delivery of goods from different planes can be prevented thereby. The vertical conveyor may deposit the selected article upon one of the two horizontal conveyors 12 or 13 running one above the other. The computer may now decide which one of the conveyors 12 and 13 and at what time it is to receive the article. The conveyors 12 and 13 may also run at different speeds. In such a case the problem of differing delivery pathways arises which may cause that article called for at a later time to arrive before the earlier called-for article. The reason may be, that such article may sit upon a plane closer to the conveyors and/or that it reaches the conveyors 12 and 13 relatively farther downstream. By choosing a deposition upon the two horizontal conveyors, in some cases by regulating the conveying speed or by disposing interlocks on the conveyors, such errors of delivery may be corrected. The construction of two or more horizontal conveyors permits goods to pass each other.

It is thought that the invention and many of its attendant advantages will be understood from the foregoing description and that it will be apparent that various changes may be made in the form, construction, and arrangements of the parts without departing from the spirit and scope of the invention or sacrificing all of its material advantages. The form heretofore described being merely a preferred embodiment.

The take-off devices 10 may consist of pushing mechanisms which extend a pusher element onto the conveyor over the U-shaped portions to push the article from its position on the U-shaped portion of the conveyor onto the conveyor element 11. After the article has been pushed off the conveyor, the pusher element is retracted. The pusher element may be pneumatically or hydraulically actuated, utilizing a conventional cylinder and piston arrangement.

The process computer 15 is not shown in the drawing but, in the drawings, it would be represented by a box having connecting lines to the readers 8 and 14. 9n

What is claimed is:

1. Storage apparatus for articles capable of being retrieved comprising at least one conveyor means disposed generally on a plurality of planes located one above the other, said conveyor means being arranged in a generally sinuous manner in each plane with the conveyor means in each plane comprising a plurality of joined loops each having generallly U-shaped portions and generally straight portions with said straight portions being disposed side-by-side in generally parallel array, a receiving station means for receiving articles and transferring said articles to said conveyor means, and take-off means for taking off articles from said conveyor means, said take-off means being arranged within at least one of said U-shaped portions for taking off articles from said conveyor means as said article is disposed in said at least one U-shaped portion of said conveyor means.

2. Storage apparatus according to claim 1 wherein said conveyor means comprises one conveyor section disposed in one plane and at least one other conveyor section disposed in another overlying plane, said conveyor sections being generally vertically aligned, said conveyor means further comprising a conveyor connecting portion extending between said planes connecting said conveyor sections.

3. Storage apparatus according to claim 2 wherein said conveyor connecting portion is disposed at an incline.

4. Storage apparatus according to claim 2 wherein a first plurality of said U-shaped portions define a first end section of said conveyor means and a second plurality of said U-shaped portions which are opposed to said first plurality of U-shaped portions define a second end section of said conveyor means, said receiving means being disposed at said first end section and said take-off means being disposed at said second end section.

5. Storage apparatus according to claim 2 wherein said conveyor connecting portion is located at said first end section.

6. Storage apparatus according to claim 2 wherein said conveyor means comprises a conveyor return portion extending between the conveyor section on the lowermost plane and the conveyor section on the uppermost plane.

7. Storage apparatus according to claim 4 further comprising delivery conveyor means receiving articles from said conveyor means as said articles are taken off of said conveyor means by said take-off means.

8. Storage apparatus according to claim 7 further comprising vertical carrying means connected between said take-off means and said delivery conveyor means.

9. Storage apparatus according to claim 7 wherein said delivery conveyor means comprise a plurality of delivery conveyors.

10. Storage apparatus according to claim 7 wherein said delivery conveyor means comprises a plurality of vertically spaced delivery conveyors extending in a direction generally perpendicular to said parallel straight portions of said conveyor means.

11. Storage apparatus according to claim 1 further comprising reader means allocated for each take-off means for reading codes on articles in the storage apparatus.

12. Storage apparatus according to claim 8 further comprising readers for each take-off means, said readers producing a reading signal for said articles being stored, said readers being connected to a process computer which receives said reading signals and thereby controls said take-off means to take off selected articles from said conveyor means.

13. Storage apparatus according to claim 12 wherein said process computer is connected to said vertical carrying means and thereby controls said vertical carrying means.

14. Storage apparatus according to claim 12 further comprising input readers connected to said process computer, said input readers being located at said receiving station means for reading articles passing on said receiving station means to said conveyor means.

* * * * *